[12] United States Patent
Heintz et al.

(10) Patent No.: US 10,570,293 B2
(45) Date of Patent: Feb. 25, 2020

(54) STABILIZATION OF CARBON NANOTUBE COATINGS TO MOISTURE

(71) Applicant: Battelle Memorial Institute, Columbus, OH (US)

(72) Inventors: Amy M Heintz, Dublin, OH (US); Chad M. Cucksey, Worthington, OH (US); Anthony D. Duong, Columbus, OH (US); Randy L. Jones, Delaware, OH (US); Michael D. Crenshaw, Orient, OH (US)

(73) Assignee: Battelle Memorial Institute, Columbus, OH (US)

( * ) Notice: Subject to any disclaimer, the term of this patent is extended or adjusted under 35 U.S.C. 154(b) by 169 days.

(21) Appl. No.: 14/936,308

(22) Filed: Nov. 9, 2015

(65) Prior Publication Data

US 2016/0137854 A1 May 19, 2016

Related U.S. Application Data

(60) Provisional application No. 62/077,227, filed on Nov. 8, 2014.

(51) Int. Cl.
| | |
|---|---|
| *C09D 5/24* | (2006.01) |
| *C09D 7/40* | (2018.01) |
| *C08J 5/00* | (2006.01) |
| *C08B 37/08* | (2006.01) |
| *C01B 32/174* | (2017.01) |
| *C09D 105/08* | (2006.01) |
| *C08L 5/08* | (2006.01) |
| *H01B 1/24* | (2006.01) |

(52) U.S. Cl.
CPC .............. *C09D 5/24* (2013.01); *C01B 32/174* (2017.08); *C08B 37/0072* (2013.01); *C08J 5/005* (2013.01); *C08L 5/08* (2013.01); *C09D 7/70* (2018.01); *C09D 105/08* (2013.01); *H01B 1/24* (2013.01); *C08J 2305/08* (2013.01); *C08J 2305/12* (2013.01)

(58) Field of Classification Search
None
See application file for complete search history.

(56) References Cited

U.S. PATENT DOCUMENTS

| | | | | |
|---|---|---|---|---|
| 2007/0116629 | A1* | 5/2007 | Harutyunyan | B82Y 30/00 423/447.3 |
| 2008/0023396 | A1* | 1/2008 | Fugetsu | B01J 20/20 210/502.1 |
| 2011/0039124 | A1 | 2/2011 | Ikeuchi | |
| 2012/0138589 | A1* | 6/2012 | Mitchell | C09D 5/00 219/202 |
| 2014/0034633 | A1 | 2/2014 | Heintz et al. | |
| 2014/0083752 | A1 | 3/2014 | Walczak et al. | |
| 2015/0228371 | A1 | 8/2015 | Kim et al. | |

OTHER PUBLICATIONS

Geng, et al. "Effect of Acid Treatment on Carbon Nanotube-Based Flexible Transparent Conducting Films", Journal of the American Chemical Society, 129, 7758-7759, May 31, 2007. (Year: 2007).*
JP2010 163568 (Toray Ind. Inc.) Jul. 29, 2010, partial English translation, WPI/Thomson, XP-002754867.
CN102110489 A (Suzhou Inst Nano-Tech & Nano-Bionics) Jun. 29, 2011, partial translation, WPI/Thomson XP002754868.
Moulton et al., "Liquid Crystal Behavior of Single-Walled Carbon Nanotube Dispersed in Bilogical Hyaluronic Acid Solutions," JACS, 9452-9457.
Extended European Search Report from EP Application No. 15003201.9 dated Jul. 25, 2016.

* cited by examiner

*Primary Examiner* — Christopher M Rodd
(74) *Attorney, Agent, or Firm* — Frank Rosenberg; Susanne A. Wilson

(57) ABSTRACT

A method of making CNT films is described in which the film is washed with a mild acid treatment. The method generates a CNT film that is not sensitive to moisture or fluctuations in moisture. The method involves the use of anionic polysaccharides or anionic glycosaminoglycans such as hyaluronic acid, sodium salt, as aqueous dispersing agents and their modification to a hydrophobic matrix after deposition. In the course of conducting the work described here, we made the surprising discovery that washing with an aqueous acidic solution resulted in a decrease in resistance through the material. The invention also includes CNT composites made by the inventive methods and a CNT composite comprising CNTs and anionic polysaccharides or anionic glycosaminoglycans further characterized by a low cationic content and a high conductivity and/or small CNT particle size as measured by SEM.

18 Claims, 7 Drawing Sheets

US 10,570,293 B2

STABILIZATION OF CARBON NANOTUBE COATINGS TO MOISTURE

RELATED APPLICATIONS

This application claims the priority benefit of U.S. Provisional Patent Application No. 62/077,227, filed November, 2014.

INTRODUCTION

Carbon nanotubes (CNT) films are useful for a variety of applications including those that take advantage of CNT electrical and thermal conductivity such as resistive heaters, EMI shielding, transparent electrodes, and heat spreaders. In general, the highest electrical and/or thermal conductivity performance is obtained by maximizing the ratio of CNTs to other non-conductive materials.

CNT networks may be fabricated by depositing a CNT-based dispersion, paint, or ink onto a substrate, using liquid deposition processes such as aerosol spraying, slot coating, inkjet printing, and gravure printing. Useful dispersions must have the appropriate viscosity and surface energy to coat the substrate, as well as sufficiently high loading of CNTs to allow formation of highly conductive films in few coating passes. Aqueous-based dispersions are preferred for must applications due to their low VOCs and compatibility with a variety of substrates. A dispersing agent or surfactant is needed to disperse the CNTs into water. Common dispersing agents and surfactants are water soluble and have a charged moiety or other chemical group that can interact with the CNTs. Upon deposition of the dispersion, the CNTs and dispersing agents or other additives dry to form a film.

The CNTs are typically inert to moisture. However, the presence of the dispersing agent in the film contributes to moisture sensitivity in the film. Moisture sensitivity can lead to changes in conductivity or to loss of mechanical and adhesive integrity during moisture exposure, humidity exposure, and subsequent coating steps.

Washing procedures, such as rinsing the film with water, may be used to remove the dispersing agent. However, such procedures are time consuming and inefficient, particularly for thick films. In addition, the water soluble additives may serve other useful purposes in the film, such as providing adhesion to the substrate or subsequent coatings.

Hyaluronic acid (HA) is one type of dispersing agent that has been reported for the dispersion of CNTs. See, for example, Moulton et al., "Liquid Crystal Behavior of Single-Walled Carbon Nanotube Dispersed in Biological Hyaluronic Acid Solutions," JACS, 9452-9457 (2007). The source of the HA used in this work was identified as Sigma Aldrich, which would have been the sodium salt of HA. Ikeuchi et al., in US Published Patent Application No. 2011/0039124 suggests the use of a large variety of dispersing agents that include a hydroxyl, including HA and polysaccharides among a long list of other possibilities. Ikeuchi et al. reported an example in which a dispersion of CNTs in sodium HA is deposited on a PET film to form a film 12 μm in thickness with 10 mg/m$^2$ CNTs. This layer was dried at 120° C. to yield a film with a surface resistance of 2.5× 10$^3$Ω/□. The resistance was found to increase when exposed to moist heat.

Prior methods, such as those mentioned above, would result in poor conductivity and/or problems with film formation. Methods for overcoming these problems are provided by the present invention.

SUMMARY OF THE INVENTION

The disclosed invention generates a CNT film that is not sensitive to moisture or fluctuations in moisture. The invention involves the use of anionic polysaccharides or anionic glycosaminoglycans such as hyaluronic acid, sodium salt, as aqueous dispersing agents and their modification to a hydrophobic matrix after deposition, using a mild acid treatment. Furthermore, the mild acid treatment is useful for modifying the surface energy of the film, which allows it to be readily wetted by paints for further reaction or coating. In the course of conducting the work described here, we made the surprising discovery that washing with an aqueous acidic solution resulted in a decrease in resistance through the material.

In a first aspect, the invention provides a method of making a composite material, comprising: providing a dispersion comprising CNTs and an anionic glycosaminoglycan or an anionic polysaccharide; depositing a dispersion onto a surface to form a film; wherein the film comprises the CNTs and the anionic glycosaminoglycan or anionic polysaccharide; and washing the film with an aqueous acidic solution having a pH between 0 and 4.

The anionic glycosaminoglycan or polysaccharide contains cations that are at least partly removed by the acid wash and replaced by protons; thus converting the glycosaminoglycan or polysaccharide to the nonionic or, more nearly nonionic form. The cations typically comprise Na, K, Ca, or Mg; preferably Na or K, most preferably Na.

In various preferred embodiments, the method can be additionally characterized by one or any combination of the following features: wherein the majority by the mass of the CNTs are single-walled CNTs; wherein the dispersion comprises CNTs and an anionic glycosaminoglycan; wherein the dispersion comprises CNTs and HA; wherein the dispersion comprises between 0.1 and 1 wt % CNTs and/or between 0.1 and 1 wt % anionic glycosaminoglycan or anionic polysaccharide; wherein the dispersion is sonicated; wherein the step of depositing comprises bar coating; wherein the aqueous acidic solution has a pH between 1 and 5.5, or between 2 and 5; further comprising a step of drying the film after the washing step; further comprising a step of coating the film with a polymeric coating; wherein the step of washing (after drying) causes a decrease in resistance, preferably a decrease of at least 10% or at least 20% or between 5 and about 40%; wherein the step of washing comprises submerging the film in the aqueous acidic solution. Preferably, the step of washing occurs after the step of depositing the dispersion, although, less preferably, some acid can be added during or prior to the step of depositing. The method wherein the step of providing a dispersion comprising CNTs and an anionic glycosaminoglycan or anionic polysaccharide includes providing a glycosaminoglycan selected from: β-D-glucuronic acid, 2-O-sulfo-β-D-glucuronic acid, α-L-iduronic acid, 2-O-sulfo-α-L-iduronic acid, β-D-galactose, 6-O-sulfo-β-D-galactose, β-D-N-acetylgalactosamine, β-D-N-acetylgalactosamine-4-O-sulfate, β-D-N-acetylgalactosamine-6-O-sulfate, β-D-N-acetylgalactosamine-4-O, 6-O-sulfate, α-D-N-acetylglucosamine, α-D-N-sulfoglucosamine, and α-D-N-sulfoglucosamine-6-O-sulfate; the method further comprising a step of adding an isocyanate to form a carbamate; the method further comprising a step of adding a blocked isocyanate; wherein the acid has a pKa of less than 4.8; wherein the acidic solution comprises phosphoric acid;

wherein the steps of washing the film and drying the film cause the Raman G/D ratio of the CNTs in the film to change 20% or less, preferably 10% or less. Preferably, the method uses a sodium glycosaminoglycan wherein, after washing with the aqueous acidic solution contains 0.5 wt % Na or less, or 0.2 wt % Na or less.

The method can be further characterized by the moisture resistance intrinsic property possessed by the film resulting from the acid wash. This property can be measured after the acid wash according to the following test: apply a polyurethane topcoat that is about 1 mil (0.025 mm) thick over the acid washed film and exposing the polyurethane coated film to a relative humidity of 40% at 60° C. for 60 hours and measuring the resistance of the CNT film at the times of 30 to 60 hours of the exposure. From 30 to 60 hours of exposure, the resistance of the CNT film preferably increases by no more than 1%, more preferably no more than 0.5% and in some embodiments 0.0 to 0.5%.

The invention also includes composite materials made according to the inventive methods.

In a further aspect, the invention includes a CNT composite, comprising: a solid dispersion comprising CNTs and a glycosaminoglycan or polysaccharide; wherein the dispersion comprises at least 20 wt % of the glycosaminoglycan or polysaccharide; wherein the sum of Na, K, Mg, and Ca associated with the glycosaminoglycan or polysaccharide is less than 1 wt % of the dispersion; and wherein the solid dispersion possesses:

a bulk conductivity of 500 S/cm or greater, preferably 1000 S/cm or greater; and/or a volume average size of CNT particles, as observable by SEM, of 5 µm or less, where size is the largest dimension observed in the SEM.

In the context of this invention, the phrase "a glycosaminoglycan or polysaccharide" refers to all of the glycosaminoglycans and polysaccharides in the dispersion. Note that the expression "at least 20 wt % of the glycosaminoglycan or polysaccharide" includes cases where there are multiple glycosaminoglycans and/or polysaccharides provided that the combined weight of glycosaminoglycans and polysaccharides is at least 20% of the mass of the solid dispersion. The phrase "associated with the glycosaminoglycan or polysaccharide" has the conventional meaning of cations that are ionically bonded or complexed with the glycosaminoglycan or polysaccharide and, for example, would exclude cations that are disposed within filler particles such as clays that may be present in the dispersion.

In various preferred embodiments, the composite can be additionally characterized by one or any combination of the following features: wherein the majority by the mass of the CNTs are single-walled CNTs; wherein the dispersion comprises CNTs and a glycosaminoglycan; wherein the dispersion comprises CNTs and HA; wherein the dispersion comprises between 30 and 60 wt % CNTs; wherein the dispersion comprises between 30 and 70 wt % glycosaminoglycans and polysaccharides; further comprising a polymeric coating disposed over at least one surface of the dispersion; wherein the sum of all cations associated with the glycosaminoglycan or polysaccharide make up less than 1 wt %, preferably less than 0.5 wt % of the dispersion; wherein the sum of Na, K, Mg, and Ca associated with the glycosaminoglycan or polysaccharide is 0.5 wt % or less, or 0.2 wt % or less of the dispersion; a resistance of 0.5 to 5 Ω/square or a conductivity of 1000 to 6000 S/cm wherein the volume average size CNT particles, as observable by SEM, of 1 µm or less, where size is the largest dimension observed in the SEM; wherein the mass average molecular weight of the glycosaminoglycan or polysaccharide is in the range of 1000 to 100,000, or in the range of 5,000 to 50,000; wherein the CNTs in the dispersion have a Raman G/D of 12 to 17; wherein the dispersion is a layer within a laminate; wherein the CNT dispersion, without a topcoat (meaning either prior to applying a topcoat or removing any topcoats for testing purposes), possesses moisture resistance such that, if the CNT dispersion is coated with a polyurethane topcoat that is about 1 mil (0.025 mm) thick and exposed to a relative humidity of 40% at 60° C. for 60 hours and the resistance of the CNT dispersion is measured at the times of 30 to 60 hours of the exposure, the resistance of the CNT dispersion preferably increases by no more than 1%, more preferably no more than 0.5% and in some embodiments 0.0 to 0.5%; wherein the CNT dispersion, without a topcoat, possesses moisture resistance such that, if heated to 120° C. for 2 hours and cooled to room temperature for 10 minutes, the resistance of the CNT dispersion increases by less than 200%, preferably less than 100%, in some embodiments between about 70 and 200%. The invention also includes a CNT composite that has a polymeric topcoat over the CNT dispersion having a thickness of about 1 mil and possesses moisture resistance such that, if the CNT composite is exposed to a relative humidity of 40% at 60° C. for 60 hours and the resistance of the CNT dispersion is measured at the times of 30 to 60 hours of the exposure, the resistance of the CNT dispersion preferably increases by no more than 1%, more preferably no more than 0.5% and in some embodiments 0.0 to 0.5%. It can be noted that the uncoated CNT dispersion is typically an intermediate article that is subsequently coated with one or more topcoats, and the inventive composite includes both the intermediate and the coated laminate. The CNT composition can also include: a substrate (such as an aircraft wing), a primer layer, the CNT dispersion as a layer, and a polymeric topcoat.

The invention is intended, in its various embodiments, to include combinations of any of the features described herein.

Glossary of Terms

A blocked polyisocyanate is an isocyanate reaction product which is stable at room temperature but dissociates to regenerate isocyanate functionality under the influence of heat.

The term "carbon nanotube" or "CNT" includes single, double and multiwall carbon nanotubes and, unless further specified, also includes bundles and other morphologies. The invention is not limited to specific types of CNTs. The CNTs can be any combination of these materials, for example, a CNT composition may include a mixture of single and multiwall CNTs, or it may consist essentially of DWNT and/or MWNT, or it may consist essentially of SWNT, etc. CNTs have an aspect ratio (length to diameter) of at least 50, preferably at least 100, and typically more than 1000. In some embodiments, a CNT network layer is continuous over a substrate; in some other embodiments, it is formed of rows of CNT networks separated by rows of polymer (such as CNTs deposited in a grooved polymer substrate). The CNTs may be made by methods known in the art such as arc discharge, CVD, laser ablation, or HiPco. The G/D ratio of CNTs is a well-known method for characterizing the quality of CNTs.

The optical absorbance spectrum of CNTs is characterized by S22 and S11 transitions, whose positions depend upon the structure distribution of the CNTs and can be determined by a Kataura plot. These two absorption bands are associated with electron transitions between pairs of van Hove singularities in semiconducting CNTs.

Carbon nanotubes can be defined by purity factors that include percentage of metallic impurities (usually catalytic residues such as Fe, Mo, Co, Mn, etc) and percentage of non-carbon nanotube impurities, which can be characterized by methods known in the art such as thermogravimetic analysis. The chemistry of the impurities can be determined by methods such as SEM-EDS. It is preferable to use carbon materials that have high purity, as these often have better combination of high conductivity and corrosion stability. Less than 1 to 2% metallic impurities are preferred. Carbons containing lower purity can also be substantially stabilized by this invention. Studies were carried out with purity as low as 70%.

Glycosaminoglycans are long unbranched polysaccharides consisting of a repeating disaccharide unit. The repeating unit (except for keratan) consists of an amino sugar (N-acetylglucosamine or N-acetylgalactosamine) along with a uronic sugar (glucuronic acid or iduronic acid) or galactose. Glycosaminoglycans are highly polar. Anionic glycosaminoglycans are characterized by having at some hydroxyl protons replaced by a counter ion; typically an alkali or alkaline earth element. Examples of glycosaminoglycans include: β-D-glucuronic acid, 2-O-sulfo-β-D-glucuronic acid, α-L-iduronic acid, 2-O-sulfo-α-L-iduronic acid, β-D-galactose, 6-O-sulfo-β-D-galactose, β-D-N-acetylgalactosamine, β-D-N-acetylgalactosamine-4-O-sulfate, β-D-N-acetylgalactosamine-6-O-sulfate, β-D-N-acetylgalactosamine-4-O, 6-O-sulfate, α-D-N-acetylglucosamine, α-D-N-sulfoglucosamine, and α-D-N-sulfoglucosamine-6-O-sulfate.

Polysaccharides are polymeric carbohydrate molecules composed of long chains of monosaccharide units bound together by glycosidic linkages and on hydrolysis give the constituent monosaccharides or oligosaccharides. Anionic polysaccharides are characterized by having at least some hydroxyl protons (the most labile hydroxyl protons are associated with carboxylic acid moieties) replaced by a counter ion; typically an alkali or alkaline earth element. Examples of anionic polysaccharides include natively anionic polysaccharide gums and natively non- or cationic polysaccharide gums being chemically modified to have an anionic net charge. Polysaccharide gums contemplated for use in the present invention include Agar, Alginic acid, Beta-glucan, Carrageenan, Chicle gum, Dammar gum, Gellan gum, Glucomannan, Guar gum, Gum arabic, Gum ghatti, Gum tragacanth, Karaya gum, Locust bean gum, Mastic gum, *Psyllium* seed husks, Sodium alginate, Spruce gum, Tara gum and Xanthan gum, the polysaccharide gums being chemically modified, if necessary, to have an anionic net charge.

Materials such as sodium hyaluronate are natural products. These may be isolated from animal sources or extracted from bacteria.

The invention is often characterized by the term "comprising" which means "including," and does not exclude additional components. For example, the phrase "a dispersion comprising CNTs and an anionic glycosaminoglycan or an anionic polysaccharide" does not exclude additional components and the dispersion may contain, for example, multiple types of glycosaminoglycan, or both glycosaminoglycan and polysaccharide, etc. In narrower aspects, the term "comprising" may be replaced by the more restrictive terms "consisting essentially of" or "consisting of." This is conventional patent terminology.

DETAILED DESCRIPTION OF THE INVENTION

Carbon nanotubes (CNT) films prepared from aqueous paints can be stabilized against moisture damage by using hyaluronic acid (HA), sodium salt as the dispersing agent and performing a mild acid wash (pH~2.5) after film deposition. The mild acid wash changes the surface energy of the film and the solubility behavior of the film. After treatment, the film does not blister after longer term exposure to humidity. It is more readily wetted and coated by paints or other organics. The treatment does not remove the HA; thus the material can be reacted with a variety of reagents, such as electrophiles like isocyanates and isobutylene, creating hydrophobic and/or crosslinked films. Other anionic glycosaminoglycan or anionic polysaccharides could be used according to the methods of the present invention, although, in some embodiments, HA is the most preferred.

Figure 1:
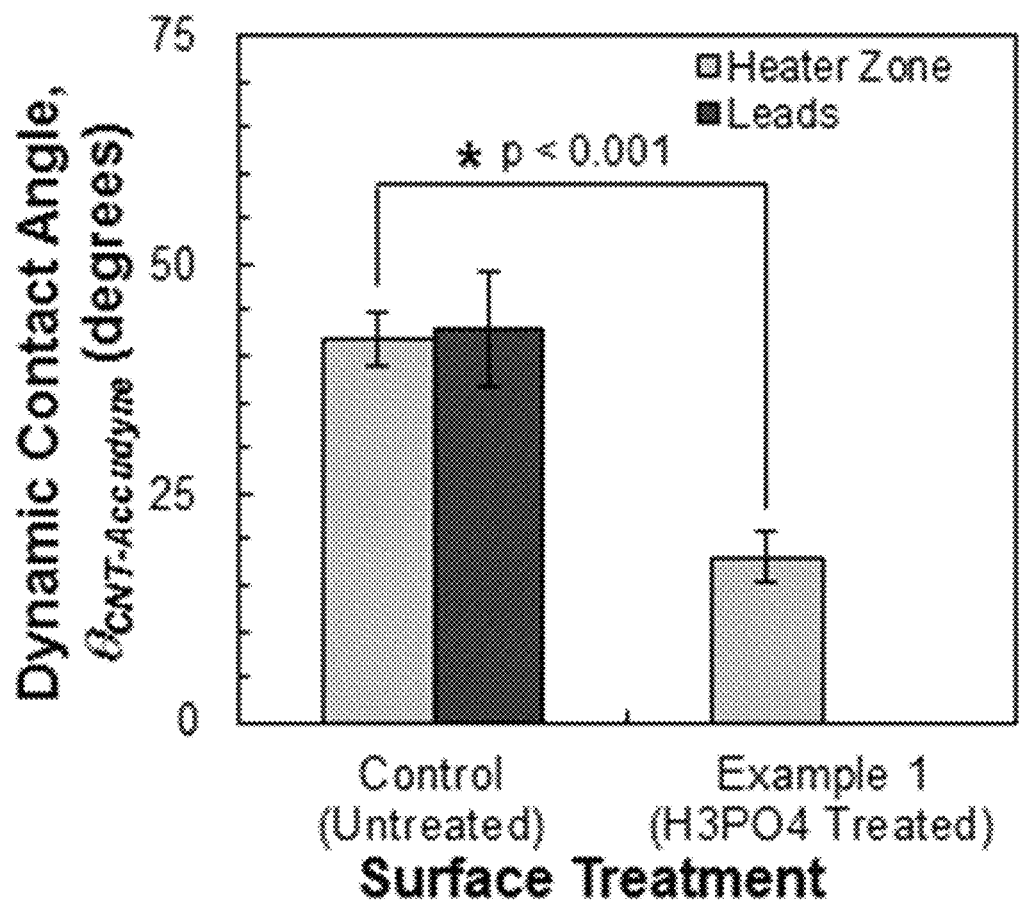
FIG. 1 is a graphical display of Equilibrium Young angle from Dynamic Contact Angle data for the phosphoric acid treated panels and untreated control panels.
Figure 2:
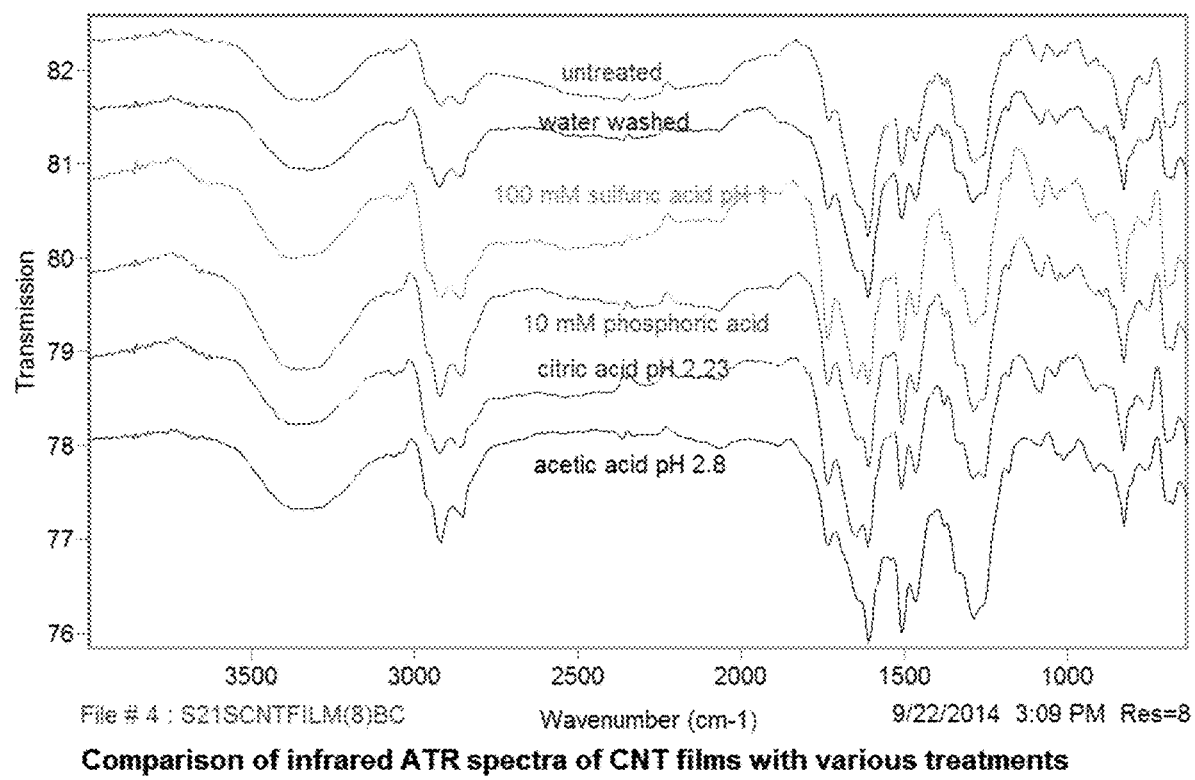
FIG. 2 shows attenuated total reflectance (ATR) spectra for various samples
Figure 3:
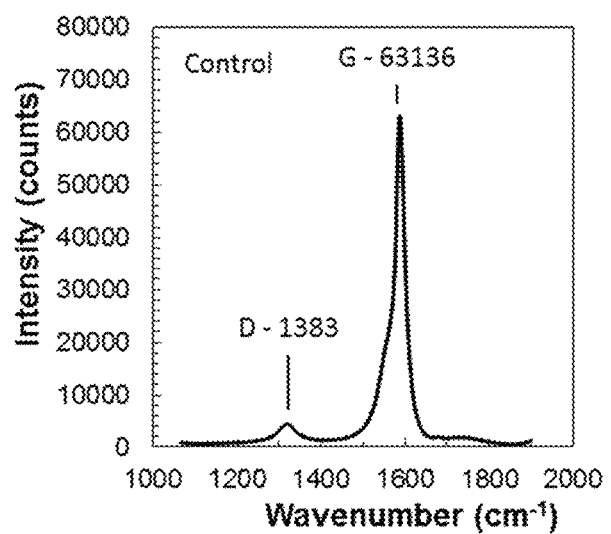
FIG. 3 shows sample Raman spectrum measured for the control CNT film with no treatment. Other spectra had the same form. The G/D ratio was found by dividing the peak intensities shown.

Sodium hyaluronate is the sodium salt of hyaluronic acid (HA). Hyaluron is a viscoelastic, anionic, nonsulfated glycosaminoglycan polymer (FIG. 1). It is found naturally in connective, epithelial, and neural tissues. Its chemical structure and high molecular weight make it a good dispersing agent and film former. CNT/HA aqueous dispersion and phase diagram has been reported in the literature (Moulton et al. J. Am. Chem. Soc. 2007, 129(30), 9452). These dispersions may be used to create conductive films by casting the solution onto a substrate and allowing it to dry. However, the resulting films exhibit blistering, i.e. loss of adhesion, upon exposure to moisture or high humidity. In addition, they suffer from resistance fluctuations that occur as a result of moisture fluctuations, as HA can expand and contract, changing the junction resistance between CNT-CNT contacts.

We found that the stability was substantially improved by treatment with a mild acid solution, preferably using an acid having a pKa less than about 4.8, more preferably less than 3.2. The pH of the treatment solution is preferably in the range of 1 to 2.5. More acidic solutions can be effective at stabilizing the film. However, care must be taken not to react with any other materials. For example, in some cases, these CNT/HA films are deposited on primed substrates, where the primer is a chromated epoxy. Such materials dissolve and/or discolor when treated with acid solutions, such as 0.1 M HCl or even 0.01M HCl (HCl has pKa of −7). The acid solutions should be non-oxidizing; in other words, it should not contain oxidizing acids such as nitric acid that react with the CNTs. In one preferred embodiment, the mild acid is phosphoric acid, generating a film comprising CNTs, hyaluronic acid, and phosphorous with a composition of approximately 44 wt % CNT, 52 wt %, HA, and 0.7 wt % P. CNT films treated according to the methods of the invention retain their conductivity, do not blister upon exposure to water, and exhibit improved resistance stability with fluctuations in moisture content.

During treatment with the acid solution, which can include washing, some of the hyaluronic acid may be extracted, so that the composition is less than 52 wt % HA. The HA is not fully extracted and this change in composition is not responsible for the stabilization, as will be shown. Rather, the stability is provided by a decrease in the sensitivity of the HA to moisture. Reaction of hyaluronate with phosphoric acid provides a structure that is substantially free of carboxylates, and associated counterions such as Na, K, etc. This acidified polymeric compound has a different surface energy, facilitated by change in conformation, and swells less than parent hyaluronate. This behavior, in turn, stabilizes the distance between CNT-CNT junctions, thereby stabilizing the resistance.

The inventive compositions have the added advantage that they may be readily reacted with hydrophobic reactants, such as alkyl and aryl isocyanates and diisocyanates, diazomethane, isobutylene and other 1,1-disubstituted alkenes, acid chlorides and diacid chlorides, and anhydrides, providing highly conductive, mechanically robust films. Furthermore, the acid-washed CNT layer is more readily wetted by paints, enabling formation of multilayer structures.

In preferred embodiments, difunctional molecules that can react with 2 different OH groups in HA (or other glycosaminoglycan or polysaccharide) are preferred because they have the potential to crosslink and stabilize the film to solvent and/or moisture exposure. Preferred compounds produce films with thermal stability greater than 200° C. Thermal stability can be determined based on known methods such as thermogravimetric analysis. The onset of decomposition should be higher than 200° C.

Reaction with isocyanates will form carbamates, ROC(=O)NHR', groups where RO is from the alcohol group of HA and C(=O)NR' is from the isocyanate reagent. As a class, the isocyanates are preferred for reacting with the OH groups of the HA (or other glycosaminoglycan or polysaccharide). Suitable diisocyanates include: Toluene 2,4-diisocyanate (2,4-TDI), 4,4'-MDI, hexamethylene diisocyanate, 1,3-Phenylene diisocyanate, 4,4'-Methylenebis(2-chlorphenyl isocyanante), 1,6-Diisocyanato-2,2,4-trimethylhexane, 3,3'-Dichloro-4,4'-diisocyanato-1,1'-biphenyl, and Poly(propylene glycol), tolylene 2,4-diisocyanate terminated. Monofunctional isocyanates may be used to change the solubility properties without crosslinking and include: 1,1-dimethoxy-2-isocyanatoethane, 2-Isocyanatoethyl methacrylate, 2-Chloroethyl isocyanate, 3-Chloropropyl isocyanate, and 4-(Chloromethyl)phenyl isocyanate, as well as fatty isocyanates such as Dodecyl isocyanate, Octyl isocyanate, Hexyl isocyanate, Tetradecyl isocyanate, Hexadecyl isocyanate, Octadecyl isocyanate, 3,5-Dimethylphenyl isocyanate, 1-Adamantyl isocyanate, Phenethyl isocyanate, 4-Butylphenyl isocyanate, 3,3-Diphenylpropyl isocyanate, 9H-Fluoren-9-yl isocyanate, and 1-Naphthyl isocyanate. The fluorinated carbamates will be less stable than the corresponding non-fluorinated carbamates. Isocyanates can be blocked. Thus, in some embodiments, the inventive compositions that include a carbamate, contain less than 1 wt % F, preferably less than 0.5 wt % F, more preferably less than 0.1 wt % F. Blocking is best accomplished with a pyrazole such as DMP or oxime such as 2-butanone oxime (MEKO) or the oxime of ethyl acetoacetate. Other blocking compounds include imidazoles, 2-methylimidazole, benzimidazoles, triazole, maleimide.

Reagents can produce simple ethers, ROR', where RO is from the alcohol group of HA and R' is from the etherification reagent. The ether product will typically be more stable than the carbamates or esters. Suitable reactants include: Diazomethane, Dimethyl sulfate, Methyl triflate, and Isobutylene.

Acid chlorides and acid anhydrides can be used to form esters. RO(C=O)R' where RO is from the alcohol group of HA and C(=O)R' is from the acid chloride or anhydride reagent. Esters are expected to be more stable that the carbamates. Diacid chlorides that can form crosslinks include: Suberoyl chloride, Terephthaloyl chloride, and Adipoyl chloride. Those that are monofunctional and can change the hydrophobicity include: Heptafluorobutyric anhydride, Pentafluoropropionic anhydride, Trifluoroacetic anhydride, 3,5-Bis(trifluoromethyl)benzoyl chloride, 2,5-Bis(trifluoromethyl)benzoyl chloride, 4-(Trifluoromethyl)benzoic anhydride, 3,5-Bis(trifluoromethyl)phenylacetyl chloride, 2,3,4,5,6-Pentafluorobenzoyl chloride, 2,3,4,5,6-Pentafluorobenzoic anhydride, Octanoyl chloride, Lauroyl chloride, and 2-Phenylbutyric acid anhydride.

A CNT network can be prepared, for example, as a dispersion of CNTs applied directly to a substrate where the solvents used in the dispersion process are evaporated off leaving a layer of CNTs that coagulate together into a continuous network. The CNT network may be prepared from dispersions and applied by coating methods known in the art, such as, but not limited to, spraying (air assisted airless, airless or air), roll-coating, gravure printing, flexography, brush applied and spin-coating. The thickness of the CNT layer is preferably in the range from 0.005 µm to 100 µm, more preferably in the range of 0.05 µm to 100 µm, and in some embodiments in the range of 0.3 µm to 20 µm.

The films of the subject invention preferably have low sheet resistance, where low resistance is defined as less than 100 Ω/square, or in the range of 0.5 to 100 Ω/square, more preferably in the range of 0.5 to 3 Ω/square. The resistance of CNT films depends on the thickness of the film and the bulk conductivity of the film, which is a function of the solid loading of CNTs in the film, the dispersion quality, and the quality of the CNTs. An advantage of our method is that low resistance films can be prepared in few coating passes and is sufficiently thin to maintain adhesion with the substrate. The bulk conductivity of films is preferably in the range of 1500 to 6000 S/cm or 2000 to 6000 S/cm, more preferably in the range of 3000 to 6000 S/cm. The bulk conductivity can be determined by measuring the sheet resistance (Ω/square) and the thickness of the CNT film. The bulk conductivity is the inverse of the bulk resistivity, which is determined as the sheet resistance*thickness). Sheet resistance may be determined by standard methods such as 4-point probe.

In addition to HA (or other glycosaminoglycan or polysaccharide), the CNT layer may include other optional additives. P-dopant additives could include, but are not limited to, perfluorosulfonic acids, thionyl chloride, organic pi-acids, nitrobenzene, organometallic Lewis acids, organic Lewis acids, or Bronsted acids. Materials that function as both dispersing agents and dopants such as Nafion. These materials contain p-doping moieties, i.e. electron accepting groups, within their structure, often as pendant groups on a backbone. Generally, these additives will be present as less than 70% by weight of the CNT film, and in some embodiments as less than 50% by weight of the CNT film. Polymers and carbohydrates that function as both dispersing agents and dopants can be distinguished from other polymer materials, i.e. those functioning as only a dispersing agent or those functioning as a structural component. Because of the presence of electron accepting moieties, these materials can form a charge transfer complex with semiconducting CNTs, which p-dopes the semiconducting CNTs and raises the electrical conductivity. Thus, these dual dispersing agent/dopants can be tolerated at a higher mass percentage within the CNT layer than other types of polymer materials or surfactants.

The thickness of a coating composition over the CNT material is preferably 2 mm or less, more preferably 150 μm or less, preferably 50 μm or less, in some embodiments, a thickness of 250 nm to 50 μm; thicker layers can experience foaming or bubbling during application that leads to pathways for a subsequent topcoat to penetrate and disrupt the conductivity of the CNT layer.

A coating composition can be applied to the CNT network by known methods; for example, bar coating or spraying. Techniques, such as troweling, that disrupt the CNT network should be avoided. After application of a protective coating to the CNT network, the coated substrate can be cured (in some embodiments, curing is conducted at ambient temperature). In the curing operation, the film forming materials crosslink to leave a mechanically durable and chemically resistant film.

A multilayered laminate resistive heater could be manufactured with conventional roll coat equipment. The electronic leads could be printed on a base substrate, such as 3M's Aerospace quality protective film. The carbon nanotube dispersion can then be applied to the film printed with circuitry with conventional roll coating methods. The protective coating could also be applied in this manner in-line.

Topcoats dissolved in solvents can infiltrate the CNTs, permitting the topcoat resin system to permeate and cure between the individual CNT fibers. The CNTs require intimate contact to transport electrical charge from one CNT to another; charge transport takes place though either tunneling or hopping. If a non-conductive polymer resin remains between the CNTs, it prevents close contact of CNTs, which increases the energy associated with electron hopping or tunneling, and behaves as a high resistance resistor in series. The effect is that the bulk conductivity of the CNT material is reduced significantly. In some preferred embodiments, a solvent-free protective layer can be used to prevent the change in resistance that accompanies the application of either organic-solvent-based or water-based coatings to CNT materials. In some preferred embodiments, a polyurethane coating is in direct contact with the CNT layer.

In some preferred embodiments, the substrate upon which the CNT composite is disposed is an airplane or part of an airplane such as a wing. The geometric surface area (that is, the area that can be measured by a ruler rather than BET surface area) of the coated article is preferably at least 0.5 cm×0.5 cm, more preferably at least 1 cm×1 cm, in some embodiments at least 5 cm×5 cm.

The sheet resistance of the CNT layer before coating may be determined by standard 4-point probe methods or other known methods for determining sheet resistance. The impact of the subsequent coatings on the sheet resistance of the underlying material may be determined by one of several methods, depending on the applications of interest. Metallic leads, such as silver painted leads, may be applied under or over the CNT layer. An overcoat can be removed and the resistance of the CNT layer measured by a 4-point probe. The thickness of this layer can be determined by potting the material in epoxy, sectioning to create a cross section, and the measurement of the thickness by optical microscopy or scanning electron microscopy. The thickness and sheet resistance are used to calculate the bulk conductivity.

EXAMPLES

Materials and Methods

All chemicals were used as received unless otherwise noted. Toluene was dried over 3 A molecular sieves prior to use. Acid solutions were created by dissolving the acid in high purity deionized water. The pH was determined using a calibrated pH meter.

Electrical resistance was determined by measuring the resistance at the two Cu leads using a calibrated digital multimeter. By accounting for the aspect ratio of the sample, the sheet resistance can be determined; however, this value contains contribution from contact resistance. Alternatively, the sheet resistance of bare CNTs (i.e. uncoated) was determined by Jandel 4-point probe.

The susceptibility of the film to blistering was determined by soaking the panel in water and/or washing with water.

The elemental composition of films was measured by Scanning Electron Microscopy-Energy Dispersive Spectroscopy (SEM-EDS). Contact angle measurements were carried out on VCA Optima using 2 μL droplet of water or a solution of Accudyne Surface Energy Test Marker Ink (44 dyne·cm). The thickness of films was determined by Nanovea optical profilometer.

The concentration of hyaluronic acid in extracts was determined by either phenol sulfuric acid carbohydrate assay or agarose gel electrophoresis.

Phenol Sulfuric Acid Carbohydrate Assay. A calibration curve was prepared from standard HA solutions with concentration of 10, 5, 2.5, 1.25, 0.625, 0.3125, 0.156, 0.078, and 0.039 mg/ml. 50 μl of each standard or sample and 150 μl of concentrated sulfuric acid was added to PCR tube, followed by 30 μl of 5% phenol in DI water. The tubes mixed and then heated to 90° C. for 5 minutes and cooled to 22° C. for 5 minutes. Next 200 μl of each sample was pipetted into one well of a UV transparent plastic 96 well plate. The absorbance was measured at 490 nm. The absorbance vs. concentration for the standards was fit to a linear curve fit. The concentration of HA in the test samples was determined from the standard curve.

Agarose Gel Electrophoresis. A 0.5% agarose gel was prepared by dissolving 0.5 grams of agarose in 100 ml of 1×TAE buffer. The hyaluronic acid ladder gel standards (Hyalose catalog numbers HYA-HILAD-20 and HYA-LO-LAD-20) were prepared per manufacturer's instructions. Samples were prepared for gel electrophoresis by diluting to 0.5 mg/ml if the concentration was known and then combining 5 μL of sample+10 μl DI water+3 μl of 2M sucrose gel loading buffer. Samples were also prepared by mixing 15 μl of sample directly with the 2M sucrose loading buffer, when samples only contained a small amount of HA. The gel was run at 20 volts for 30 minutes then 40 volts for an additional 3.5 hours. The gel was stained with 0.005% Stains All in 50% ethanol by incubating overnight. The staining solution was removed with ethanol destain solution. The gel was photographed using a scanner, camera, or gel imaging station.

Carbon nanotubes films ("panels") were created as follows. High purity double wall carbon nanotubes were dispersed in a solution of hyaluronic acid, sodium salt from *Streptococcus Equi* in water using sonication. A target composite panel was prepared by spraying Deft epoxy primer onto carbon fiber epoxy composite; two Cu leads were attached in parallel with a spacing of 2 inches apart to the panels. The resulting dispersion was sprayed with an aerosol spray gun onto the panels to produce a 2 inch by 2 inch square CNT film between leads, with a thickness of approximately 2 μm, and composition of 45% carbon nanotubes and 55% hyaluronic acid, sodium salt. The film was dried for at least 24 h overnight. Some panels were also created by spraying CNT dispersion onto primed panels without Cu leads.

A limited set of samples was prepared with two other sources of carbon nanotubes—arc discharge SWNTs with 70% purity or >90% purity. The experiments confirmed that these materials could be substituted into the invention.

Water Washing/Moisture Stability

Example 1 (Phosphoric Acid pH=2.37). 500 mL of HPDI water was added to a beaker, and o-phosphoric acid (85% w/w) was added until the pH of the solution was 2.37. A panel was submerged in the stirred acid bath for 5 min. No blistering was observed. The panel was allowed to dry. No discoloration was observed in the primer. The Cu leads appeared cleaner and shiny. The resistance decreased upon treatment from 1.4±0.2Ω to 0.9±0.1Ω. No blistering was observed when samples were washed with water.

Comparative Example 1

(Water). The CNT film was washed with water. Samples submerged in water for 5 minutes showed blistering. The CNT coating became raised and developed blisters on the surface (FIG. 1). The blistered appearance disappeared after the CNT coating dried. Samples submerged for 24 h showed blistering. After drying, the resulting film was re-submerged in water for 5 days. No blistering was observed. The resistance increased slightly from 3.04±0.04Ω to 3.2±0.3Ω. Analysis of the wash water by phenol-sulfuric acid carbohydrate assay showed the presence of HA in the extract, indicating that HA was removed during washing.

Comparative Example 2

(Hydrochloric Acid, pKa=−7). The CNT coating soaked in 0.1M or 0.01 M HCl overnight. No blisters were observed even after a ~1 hr soak. However, the primer was discolored due to reaction with the HCl. This example shows that an excessively strong acid discolors the primer; however, the acid might be suitable for a system with a less sensitive primer.

Comparative Example 3

(Phosphoric Acid pH>2.65). 500 mL of HPDI water was added to a beaker, and o-phosphoric acid (85% w/w) was added until the pH of the solution was 2.65. A panel submerged in the stirred acid bath for 5 min. Very slight blistering was observed. Thus, a more acidic solution is needed to completely eliminate blistering.

HA Extraction Using Water or Dilute Phosphoric Acid

Four CNT-coated panels were placed into two humidified boxes. Water was added to two of the panels (350 μl) and dilute H3PO4 (pH=2) was added to the other two panels, forming small pools that covered part of the CNT coating. Aliquots of 50 μL were removed at 1 h, 3, and 7 h. These samples were analyzed using the phenol sulfuric acid carbohydrate assay and were found to contain quantifiable amounts of HA. A control of dilute phosphoric acid alone was also analyzed and does not increase the background absorbance at 490 nm. Substantially more HA was present in the water soaked samples than in the acid soaked samples (Table 2). Knowing the amount of HA that was contained in 500 μl of CNT paint applied allowed calculation of the percent that was removed from the coating. (X mg/ml/0.74 mg/ml possible)*100=X %. The results indicate that the removal of HA from the films is not the stabilization mechanism for acid washed samples.

TABLE 1

Control Samples

| Control Sample | Abs @ 490 |
|---|---|
| Water blank | 0.037 |
| Dilute phosphoric acid | 0.037 |
| 0.5 mg/ml (1:20 in water) | 0.177 |
| 0.5 mg/ml (1:20 in acid) | 0.174 |

TABLE 2

Concentration of HA in Eluted Samples

| Sample | HA Concentration mg/ml | Percent of Applied HA That Eluted |
|---|---|---|
| T = 1 hr, Water | 0.357 | 48% |
| T = 7 hr, Water | 0.504 | 68% |
| T = 22 hrs, Water | 0.487 | 66% |
| T = 1 hr, Acid | 0.188 | 25% |
| T = 7 hr, Acid | 0.210 | 28% |
| T = 22 hrs, Acid | 0.239 | 32% |

Gel electrophoresis analysis shows similar results. More HA was removed by the water soak (darker bands) compared to the phosphoric acid soak. The concentration of HA in the water samples appeared relatively constant as a function of incubation, while in the phosphoric soaked samples the HA concentration increased over time. The 0.5 mg/ml HA samples that were prepared to confirm that the phosphoric acid did not interfere with the carbohydrate assay were also run. To make these a 10 mg/ml stock of HA was diluted 1:20 with water or dilute phosphoric acid. These samples had been stored at room temperature for about 4 days prior to analysis and both have a similar streak of high molecular weight HA indicating that the dilute phosphoric acid does not degrade the HA.

While some HA is removed during the phosphoric acid wash, the amount is much lower than for the water wash. More than 70% of the hyaluronic acid remains in the film after treatment for 1 h. Given that the CNT films can be stabilized by treatment with phosphoric acid for only 5 minutes, it appears that the primary mode of stabilization is not related to removal of the HA, but rather due to a change in the solubility characteristics of the HA.

It is know that the viscoelasticity of HA in aqueous solution is pH dependent and effected by the ionic strength of its environment. Hydrophobic faces exist within the secondary structure of HA, formed by the axial hydrogen atoms of about eight CH groups on the alternating sides of the molecule. Through the addition of phosphoric acid, the change in ionization from carboxylate to carboxylic acid results in a conformation change of the HA that makes it more hydrophobic.

Reaction with HA

The presence of HA remaining in the film and its ability to be wetted by hydrophobic molecules allows the formation of hydrophobic HA and/or crosslinked HA by reaction with electrophiles.

Example 2 (Blocked Isocyanate+Pretreatment). A CNT-coated panel having an initial mass of 12.1626 g and resistance of 1.1Ω was submerged in a stirring solution o-phosphoric acid (85% w/w) at pH 1.99 for 5 min. No blistering was observed. The panel appeared undamaged. After air drying, the mass of the panel was 12.1561 g and the resistance 1.3Ω. A solution of blocked isocyanate was prepared by adding 306 μL of Trixene Aqua BI 220 to 2.69 g of water. The solution was applied to the CNT coating. After air drying, the resistance was 1.6Ω and the mass was 12.3040 g. The panel was placed inside an oven at 80° C. for ten minutes, then 90° C. for ten minutes, and finally 100° C. for ten minutes. The temperature was then increased to 120° C. (the unblocking temperature) and the panels were allowed to dwell at this temperature for 48 h. The oven was cooled to RT. The resulting panel weighed 12.1182 g and had a shiny coating visible on the surface, with a resistance of 5.2Ω. The surface of the panel repels water.

Comparative Example 4

(Blocked Isocyanate). 1.6 g of neat Trixene Aqua BI 220 was added directly to CNT-coated panel. The reactant would not form a uniform coating and the CNT soon began lifting off of the panel. The CNT coating was effectively destroyed. Next, 1.5 mL of Trixene Aqua BI 220 was added to 3.0 mL of water and mixed well. This solution was applied to a panel in aliquots of 1-mL, allowing each aliquot to dry thoroughly before the next addition. Care was taken so that the CNT coating was not disturbed. The initial mass of this panel was 11.77 g, and the mass of the panel after addition of the blocked isocyanate and air drying was 12.47 g. The resistance was 14.3Ω. The panel was placed in an oven at 90° C. for 10-15 minutes, then 120° C. for 90 minutes. The panel was cooled to RT. The resulting panel had a mass of 12.27 g, resistance of 29.9Ω, and a sticky surface. Rinsing with water did not reduce the surface stickiness. It was surmised that the panel had been overloaded with the blocked isocyanate. In an effort to reduce the amount of blocked isocyanate material added to the panel, a formulation consisting of 770 μL of Trixene Aqua BI 220 and 2.31 mL of water was carefully applied to a panel. The initial mass of this panel was 11.17 g. After air drying, the panel mass was 11.88 g and the resistance was 16.8Ω. After treatment in the oven, the mass of the panel was 11.35 g and the resistance was 43.2Ω. CNT/HA films are not readily coated with blocked isocyanate, yielding poor quality coatings and high resistance. A subsequent experiment involving the application of Trixene Aqua BI 220 alone (no HA, no CNT) to a bare panel, followed by heat treatment, produced a stable coating on the panel.

Example 3

(Diisocyanate+Pretreatment). A CNT-coated panel having an initial mass of 10.5237 g and resistance of 4.5Ω was submerged in phosphoric acid pH=1). For 10 min. No blistering of the CNT coating was observed. The panel was allowed to air dry and then vacuum dried, after which the mass was 10.5370 g and the resistance was 2.2Ω. 260 μL of hexamethylene diisocyanate was added to 5 mL of dry toluene and mixed well. This solution was applied drop-wise to the panel and allowed to dry overnight, the subsequently rinsed with methanol. The panel was allowed to soak in water and then rinsed vigorously with water. No blistering was observed. The panel mass was 10.5312 g and the resistance 3.2Ω.

Comparative Example 5

(Diisocyanate). 65 μL of hexamethylene diisocyanate was diluted in 5 mL toluene. This solution was applied to a CNT-coated panel, without allowing the panel to dry between aliquots. After the solvent evaporated, the surface of the panel appeared to be "greasy." The resistance was 4.1Ω. Rinsing with water produced undesirable blistering. A second CNT-coated panel was dried overnight in vacuum. The mass of panel was 12.40 g and the resistance was 3.5Ω. A isocyanate solution (containing 1.3 mL of hexamethylene diisocyanate and 3.7 mL of dry toluene) was added as before, but after approximately 3.5 mL of solution had been added, the panel would no longer dry between additions. The panel was kept in air overnight. The following morning, the panel was still visibly wet. The panel was rinsed thoroughly with water and finally soaked overnight in water. After allowing the panel to dry, a spotty coating was observed (some shiny spots on a flat surface). The mass of the panel was 12.40 g and the resistance was 5.4Ω. From these experiments, it appeared that even a large excess of directly applied hexamethylene diisocyanate to untreated CNT/HA did not produce a consistent coating.

Example 4

(Isobutylene). A panel with initial resistance of 1.1Ω was submerged into pH=2 phosphoric acid bath. No blistering was observed. The panel was removed and allowed to dry. The resistance was 0.9Ω. The isobutylene reactor was evacuated to 3 μm Hg and then pressurized with isobutylene to 10 PSI. The panel was allowed to dwell in the reactor over the weekend, after which the pressure inside the reactor was 6 PSI. The reactor was purged as described above, the panel was removed. The resistance was 0.9Ω and the coating appeared visually unchanged.

Conductivity, Surface and Wetting Properties

The subject invention creates films with good dispersion quality, surface finish, and low surface energy. The following examples indicate these properties.

The quality of the dispersion can be determined by casting a small droplet of CNT/HA dispersion (~5 to 10 μL) onto a glass slide and allowing the water to evaporate. The resulting film should be dark and shiny, showing little to no clumpy particulate. Furthermore, examination of the film by optical profilometry will show that the film—when examined over several 5 mm sections—is smooth, where smoothness is defined as Zmax−Zmean is less than 1.5 μm or, more preferably, RMS roughness is less than 0.5 μm.

The conductivity of these droplets may be determined by measuring the sheet resistance by 4-point probe and the film thickness (Conductivity=1/(Sheet Resistance*Film Thickness)). Dispersion 1 was 0.2 wt % high purity double wall carbon nanotubes and 0.24 wt % HA, sodium salt in water, cast as three droplets on a glass slide. Based on measurements of eight different batches, the conductivity of films prepared from Dispersion 1 was 3800±500 S/cm. Dispersion 2 was 0.12 wt % high purity mixture of single wall and double wall carbon nanotubes prepared by CVD and 0.14 wt % HA sodium salt, in water. Based on measurements of eight different batches, the conductivity was 5800±800 S/cm.

Two sample coupons were prepared as follows. Carbon fiber coupons (4"×3") were sanded, primed and scuffed. Two parallel Cu leads (2" long) were attached, spaced two inches apart, with epoxy. The surfaces were treated with atmospheric plasma, then coated with a dispersion of double wall carbon nanotubes and hyaluronic acid, sodium salt (w/w ratio of CNT/HA=0.83) in water by successive spray passes until the dried film had a resistance of approximately 1 S2/sq. One coupon (Example 5) was given a phosphoric acid treatment involving submersion in 10 mM phosphoric acid (pH~2.5) for 5 minutes, air drying, dousing with a steady stream of DI water and a final air drying. An untreated coupon (Control) was left without any treatment.

The surface energy of the treated CNT layer was evaluated by measuring the dynamic contact angle of the film with a fluid of known surface energy (45 dyne-cm) using the treated and control coatings. This was done using the Accudyne Surface Tension ink solutions. A tilted drop method was used. The calculation methods described in the literature[1] were used to find the equilibrium Young angle. Dynamic contact angle was measured in triplicate using independent locations on each coupon. Triplicate measurements were taken in the heater zone area and over the leads.

[1] Tadmor, Rafael (2004) Line Energy and the Relation between Advancing, Receding and Young Contact Angles. *Langmuir*, 20, 7659-7664.

As shown in the Table 3 and FIG. 1, the phosphoric acid treatment significantly reduced the dynamic contact angle of the accudyne solution with the CNT/HA film (p<0.001). This is indicative of a reduced surface energy due to the phosphoric acid treatment.

TABLE 3

Tabulated Dynamic Contact Angle data for the untreated (Control) panel and the phosphoric acid treated panel (Example 5).

| | Receding Avg ± Stdev | Advancing Avg ± Stdev | Equilibrium Avg ± Stdev |
|---|---|---|---|
| Control | 32 ± 4 | 52 ± 2 | 42 ± 3 |
| Example 5 | 13 ± 3 | 23 ± 6 | 18 ± 3 |

Diofan B204—a high solid content polyvinylidene chloride latex (anionic aqueous emulsion) with a surface tension of 45 dynes-cm—does not coat the Control Panel (CNT/HA film) well—it forms streaks and cracks when applied by either an aerosol spraying method or a flooding method, where the surface is on a 45° inclined plane and flooded with latex. The panel of Example 5 (CNT/HA treated with ~10 mM Phosphoric Acid (pH~2.2-2.5) by submersion for 5 minutes) is wetted by the Diofan better using the 45° Flood method.

The results of this experiment indicate that the phosphoric acid treatment reduces the surface energy of the CNT coating. Moreover, this reduction in surface energy can be detected by measuring the dynamic contact angle of a fluid of known surface energy with the CNT using the procedures described above.

Chemical Analysis of Films

Mild acid treatment of a sodium hyaluronate/carbon nanotube film improves its surface energy and sensitivity to water Eliminating the sensitivity to water reduces the expansion and contraction of the film to water, which in turns stabilizes its electrical resistance to environmental exposure.

The materials of this invention were characterized by FTIR spectrum showing the presence of the organic dispersing agent, such as hyaluronic acid, and EDS spectrum that shows absence of Na. Control samples, either without treatment or washed with water, show Na by EDS. This treatment is to be distinguished from CNT doping treatments or CNT oxidation treatments, where acids are used to p-dope the CNTs or oxidize the CNTs. The treatment does not change the electronic properties of the CNTs (no change in position of the G band in Raman) and does not damage the CNTs (no change in the G/D ratio in Raman).

Samples were created by drop casting CNT dispersion composed of double wall carbon nanotubes (DWNTs) and sodium hyaluronate onto substrates. The water was evaporated from droplets, leaving a film on the substrates. For ATR-FTIR and Raman, substrates were epoxy-primed carbon fiber coupon. Preparation was as follows: (1) a 1"×1" section of a 3"×2" primed carbon fiber coupon was masked off; (2) CNT dispersion was pipetted onto the unmasked area until it is completely covered; (3) the dispersion was allowed to dry in ambient conditions for >24 hours; (4) the masking tape was removed; and (5) different acid treatment methods were applied. For EDS, substrates were an aluminum SEM stub. Preparation was as follows: (1) the dispersion was pipetted onto an aluminum stub until it is coated; (2) the dispersion was allowed to dry in ambient conditions for >24 hours; the treatment methods were applied.

Treatment Methods:
  Copious Water Wash
    Coupon held under gently running DI water faucet for 90 seconds. Allow to air dry
  Low pH Sulfuric Acid (pKa=−3)
    Prepared a solution of 100 mM sulfuric acid. Measured the pH with a pH probe (pH=0.95)
    Coupon submerged in acid for 5 minutes. Air dried.
    Coupon held under gently running DI water faucet for 90 seconds. Air dried.
  Phosphoric Acid (pKa1=2.148)
    Prepared a solution of 10 mM sulfuric acid.
    Submerged CNT film in acid for 5 minutes. Allowed to air dry.
    Held coupon under gently running DI water faucet for 90 seconds. Allowed to air dry.
  Citric Acid (pkA1=3.13)
    Prepared a solution of 17 mM citric acid. Measured the pH with a pH probe (pH=2.23)
    Submerged CNT film in acid for 5 minutes. Allowed to air dry.
    Held coupon under gently running DI water faucet for 90 seconds. Allowed to air dry.
  Acetic Acid (pKa=4.7)
    Prepared a solution of 100 mM sulfuric acid. Measure the pH with a pH probe (pH=0.95)
    Submerged CNT film in acid for 5 minutes. Allow to air dry.
    Held coupon under gently running DI water faucet for 90 seconds. Allow to air dry.

EDS shows that the Control (untreated) and a Comparative Example (water wash), contain Na. On the other hand, the acid treatments of this invention do not contain any Na, Mg, K, or other cations. FTIR analysis of the acid washed samples show the spectral signatures that are indicative of organic groups present in hyaluronic acids, such as 1617 $cm^{-1}$ and 1411 $cm^{-1}$ from amide linkages, 1150 $cm^{-1}$, 1078 $cm^{-1}$, and 1045 $cm^{-1}$ from C—O—C, 1377 $cm^{-1}$, and broad peak near 3400 cm$^{-1}$ from OH. Raman analysis of the G/D ratio, indicative of CNT purity, shows that the values for the acid washed samples are within those observed for water washing and untreated—indicated the acid was does not oxidize the CNTs. The position of the G band can be used to track doping effects. As shown by the stability of its position, the acid treatment does not dope, or influence the electronics of the CNTs.

TABLE 4

Elemental Composition of CNT films with various treatments

Wt % from EDS

| Element | Control | Water Wash | 100 mM Sulfuric Acid (pH 1) | 10 mM Phosphoric Acid (pH 2.5) | 17 mM Citric Acid (pH 2.3) | 580 mM Acetic Acid (pH 2.87) |
|---|---|---|---|---|---|---|
| C | 60.40 | 75.60 | 61.90 | 78.10 | 80.00 | 68.20 |
| N | 1.40 | 1.70 | 1.50 | 2.40 | 2.40 | 1.90 |
| O | 12.60 | 15.90 | 17.80 | 15.80 | 15.40 | 17.80 |
| Na | 3.30 | 2.80 | 0.00 | 0.00 | 0.00 | 0.00 |
| Mg | 0.30 | 0.30 | 0.10 | 0.10 | 0.10 | 0.10 |
| Al | 20.30 | 2.30 | 15.50 | 1.40 | 1.00 | 10.40 |
| Si | 0.80 | 0.40 | 0.50 | 0.30 | 0.20 | 0.40 |
| P | 0.30 | 0.20 | 0.10 | 0.70 | 0.10 | 0.20 |
| S | 0.50 | 0.40 | 2.30 | 0.70 | 0.50 | 0.60 |
| Cl | 0.30 | 0.50 | 0.30 | 0.50 | 0.50 | 0.50 |

TABLE 5

Raman G and D peak intensities for all samples along with the G/D ratio (633 nm laser)

Intensity (counts)

| Peak | Control | Water Wash | Sulfuric Acid | Phosphoric Acid | Citric Acid | Acetic Acid |
|---|---|---|---|---|---|---|
| G position | 1587.5 | 1587.5 | 1587.5 | 1587.5 | 1586.6 | 1587.5 |
| G/D ratio | 14.4 | 10.1 | 15.6 | 16.8 | 10.9 | 12.1 |

Electrical Resistance Stability

Example 6

Coupons were prepared as in Example 1. Next samples were coated with a thin mist coat (~1 mil thick) of a solvent-based epoxy primer, dried, and then coated with a layer of polyurethane topcoat according to MILSPEC 85285, using the accelerated cure method.

Comparative Example 6

Samples were prepared as in Example 6 except that no mild acid washing was carried out.

The electrical resistance of the Example 6 and Comparative Example 6 were measured at the two Cu leads—yielding initial resistance values. Next, samples were exposed to a combination of heat and humidity by placing in a chamber at approximately 40% relative humidity (RH) and 60° C. for up to 125 h. The resistance was measured while the samples were hot and humid.

Example 6 showed much better stability than the sample prepared according to Comparative Example 6. The resistance readings as a function of time are shown in the Table

TABLE 6

| Time (hours) | Acid Washed (Ex 6) | Untreated (Comp 6) |
|---|---|---|
| 2 | 2.08871 | 2.56097 |
| 5 | 2.12184 | 2.55734 |

TABLE 6-continued

| Time (hours) | Acid Washed (Ex 6) | Untreated (Comp 6) |
|---|---|---|
| 10 | 2.20091 | 2.56679 |
| 20 | 2.27837 | 2.60363 |
| 40 | 2.31521 | 2.66845 |
| 60 | 2.31652 | 2.71693 |

Figure 10:
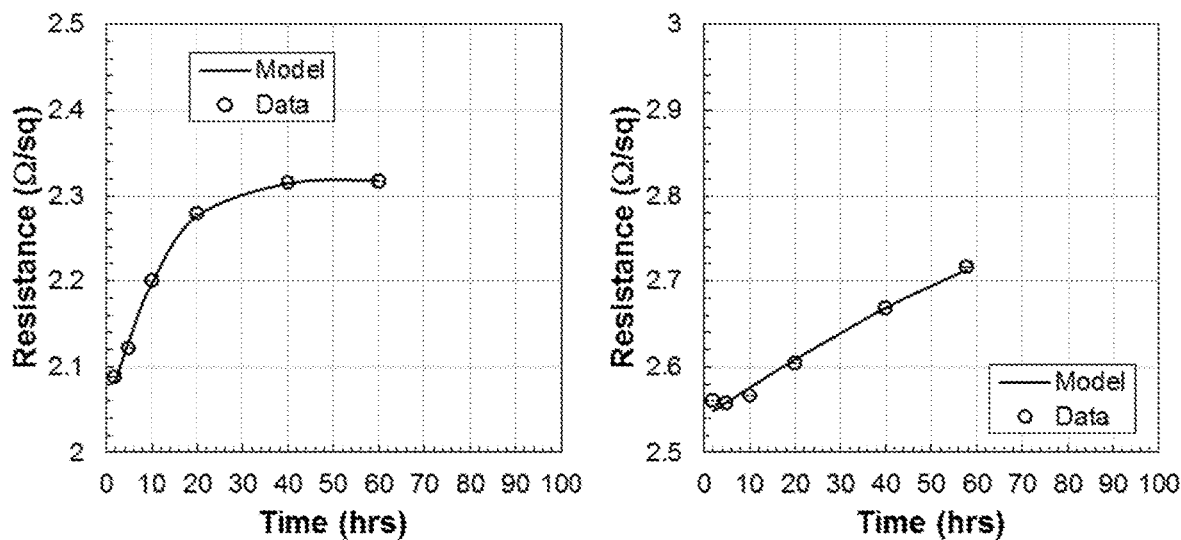
FIG. 10 shows plots of resistance versus time for Example 6: PA Treated (left); Not PA Treated (right).

Data was fit to a sigmoidal model using a numerical non-linear least squares method.

$$R = \left(\frac{2(R_\infty - R_{start})}{1 + e^{-rt/\tau}}\right) - (R_\infty - 2R_{start})$$

Where $R_\infty$ is the resistance value that the model approaches for long times.
$R_{start}$ is the starting resistance value for the model
And $\tau$ is the modeled time required to reach 95% of $R_\infty$
Plots of resistance versus time are shown in FIG. 10. PA Treated (left): $R_{start}$=2.05; $R_\infty$=2.32; $\tau$=30 Not PA Treated (right): $R_{start}$=2.54; $R_\infty$=2.83; $\tau$=156
For both regressions, $F_0 > F_{critical}$=19, implying a good fit.
Example 6 acid washed sample plateaus at ~30 hours (tau), while the untreated Comparative Example never plateaus (tau is greater than the last time point taken).

For example, Example 6 increased resistance by 5.4% with the exposure. Comparative Example 6 increased resistance by 7% after 77 h and was not yet stabilized. The rate of resistance increase at this point was still 0.036 Ω/day (1.3% increase per day).

Bare (uncoated) samples also exhibit better stability to humidity and temperature fluctuations. Bare CNT films—both acid washed and untreated—were placed in 120° C. oven for 2 h and then removed to ambient. After 10 minutes, the resistance was recorded. Both samples showed an increase relative to the initial resistance. For the untreated sample, this change was greater than 400%, while for acid washed it was only 71%. As the samples were left in ambient, their resistance decreased to similar values. We believe that this change is associated with humidification of the sample, which includes both slow and fast processes. The sample is completely dried by exposure to 120° C. As it stands in ambient air, it becomes hydrated, which can change the CNT-CNT junction distance, causing resistance changes. The sample treated with acid is less sensitive to moisture than the untreated sample.

TABLE 7

| | Initial Resistance (Ω/square) | Resistance after 2 h at 120° C. and 10 minute ambient | Resistance after 2 h at 120° C. and overnight ambient |
|---|---|---|---|
| Acid Washed | 2.1 | 3.6 71% | 3.2 52% |
| Untreated | 2.7 | 10.9 419% | 3.7 76% |

HA Molecular Weight

Assays were developed to characterize and detect hyaluronic acid to aid in determining if hyaluronic acid is removed from the CNT paint coating after it is applied and dried. Two assays were developed to detect and characterize hyaluronic acid. An agarose gel electrophoresis method as reported by Lee and Cowman and Bhilocha et al was used to measure the size of the hyaluronic acid. A phenol-sulfuric acid carbohydrate analysis method adapted from Musako et al was used to measure the concentration of hyaluronic acid in solution. Hyaluronic acid was analyzed using agarose gel electrophoresis following the method reported by Lee and Cowman. This method allows for the determination of the molecular weight of the HA and qualitative estimation of the amount of HA relative to other samples in the gel by comparing the band intensities (darker color equals more HA). Standards (ladders) are commercially available that contain a mixture of hyaluronic acid that are of known molecular weight. These HA standards are run with the test samples and used to determine the molecular weight of the HA by comparing the band positions on the gel. Larger molecular weight HA migrates through the gel slower than lower molecular weight HA. In the initial gel analysis samples of HA from two different lots were compared. A sample of 0.148% HA that had been sonicated was also analyzed on this gel. Below the molecular weight of the HA prior to sonication is variable as indicated by a streak on the gel but is mostly high molecular weight, greater than 509 kDa. The sonicated sample molecular weight is between 111 and 33 kDa.

A hyaluronic acid solution (1× concentration 0.148%) was sonicated on ice following the normal sonication procedure as used to prepare CNT dispersions and samples were removed at T=0, 5, 10, 15, 20, and 25 minute of sonication time. The samples were analyzed using the agarose gel method. After only 5 minutes of sonication the molecular weight is reduced to ~40 kDa. Further sonication does not appear to make it any smaller, although very small MW fragments could have run off the gel.

A 0.148% (1.48 mg/ml) sample of hyaluronic acid that had been sonicated for 25 minutes was diluted to 0.5 mg/ml with water and then further diluted serially 1:3 to make samples that are 0.167, 0.056, 0.0185, 0.0062, 0.0021, and 0.007 mg/ml. These samples were further diluted 1:3 when preparing them for loading onto the gel (5 ul sample+10 ul water+3 ul loading buffer) and the full 18 μl was loaded to each well. Bands on the gel could easily be seen in lanes 2 and 3 containing 0.5 and 0.167 mg/ml samples. Lane 4 with the 0.056 mg/ml sample had a very faint band that was visible. The sample with the lowest concentration of HA that can be detected in the gel is 0.056 mg/ml. If the sample were not diluted with water prior to analysis the sensitivity could be decreased to detect HA in a sample with as little as 0.0187 mg/ml. The minimum amount of HA that can be detected is 280 ng. (0.056 mg/ml×0.005 ml loaded to gel=0.00028 mg=0.28 μg=280 ng).

Soaking CNT/HA Panels in Water, HCl, or NaOH

Figure 4:
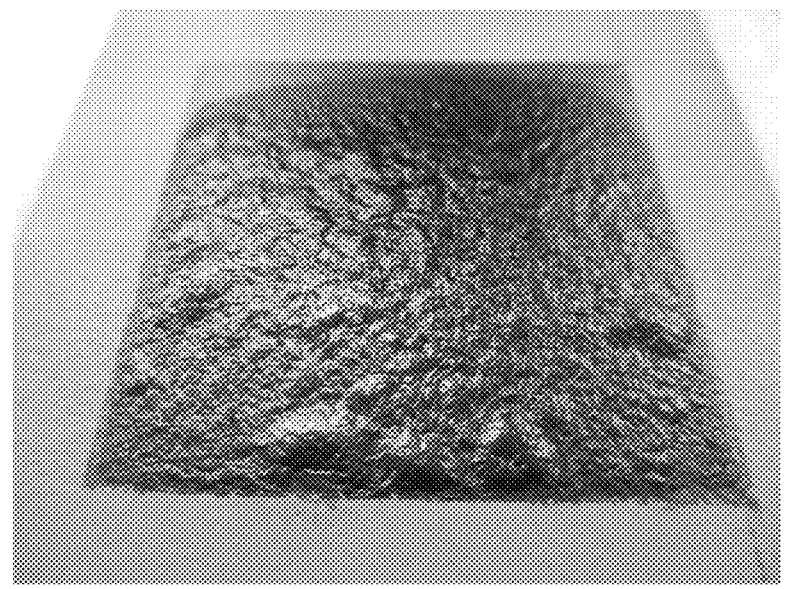
FIG. 4 illustrates blistering of CNT coating upon soaking in water
Figure 5:
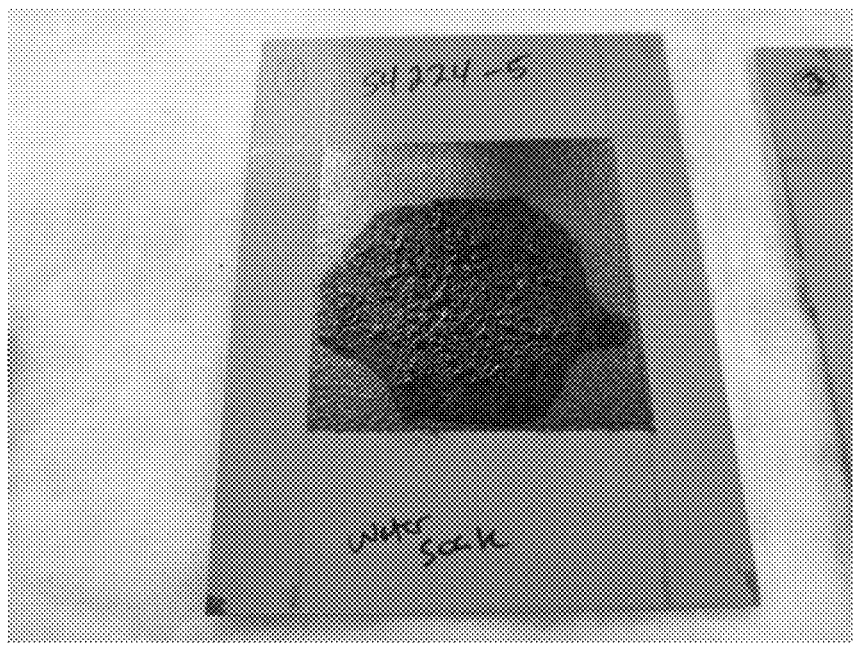
FIG. 5 shows that the surface returns to normal when dried
Figure 6:
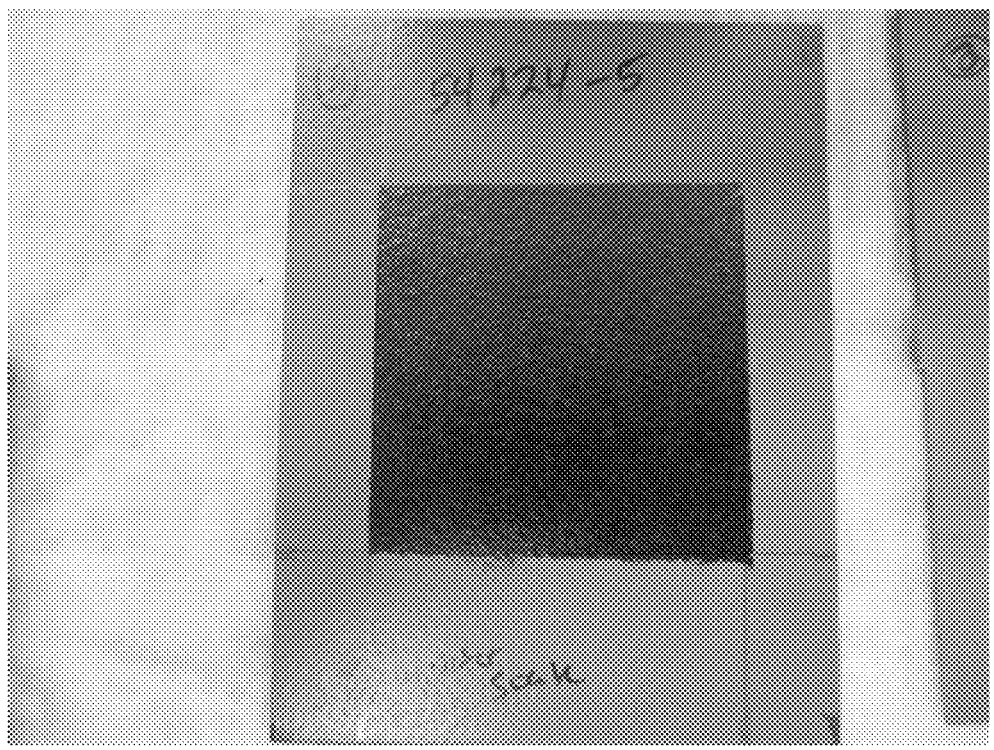
FIG. 6 shows a fully dried CNT Coating after water soak

After an overnight soak in water the CNT coating became raised and developed blisters on the surface (FIG. 4). The blistered appearance disappeared after the CNT coating dried (FIGS. 5 and 6). The CNT coating soaked in 0.1M HCl overnight did not blister even after a ~1 hr soak in water to remove residual HCl. The surface of both had an "orange peeled" texture but so did underlying primer layer. The HCl treatment discolored the primer. When the water soaked panel was dried and placed back into water it did not blister or only had very minor areas of blistering. Test panels were also coated with HA without CNT's producing a shiny coated surface. After soaking in water or 0.1M HCl the surfaces were no longer shiny, indicating the HA has dissolved. The surface resistivity measurements decreased for the panel soaked in 0.1M HCl, but remained similar to the initial measurements or increased slightly for the panel soaked in water (Table 8). EDS analysis was performed on the coupons that had CNT coat, HA coat, and primer only. A difference in sodium content was found.

TABLE 8

Surface Resistivity Measurements for Panels Soaked in Water or 0.1M HCl

| Resistivity Prior to Water Soak | Resistivity After Water Soak | Resistivity Prior to HCl Soak | Resistivity After HCl Soak |
|---|---|---|---|
| 3.04 | 3.30 | 2.78 | 2.06 |
| 3.08 | 3.58 | 2.81 | 1.92 |
| 3.06 | 3.06 | 3.06 | 1.95 |
| 2.97 | 3.17 | 2.73 | 2.48 |
| 3.08 | 2.89 | 2.48 | 2.33 |

Soak testing was again performed but using smaller primed composite test coupons (~"2.75×-1") that had been coated with CNT's using an air brush in a small area ~1"×1". Wash solutions tested were 0.1M HCl, 0.01M HCl, 0.1M NaOH, and 0.01M NaOH. Two CNT coated samples were placed into petri dishes and covered with 20 ml of wash solution and incubated on an orbital shaker at 40 RPM for ~15 hours. After 10 minutes the water samples and 0.01M NaOH samples show signs of blistering and the others do not. After ~15 hours the water and 0.01M NaOH samples were blistered, the 0.1M NaOH samples had a few very minor blisters, and the 0.1M and 0.01M HCl samples did not blister. The wash solutions were removed from the dishes and saved for analysis and the samples were rinsed with DI water and then transferred to new dishes containing DI water. After 4.5 hours of soaking in water, the 0.1M and 0.01M HCl samples have no blisters. The water and 0.01M NaOH samples are blistered as much as they were after the initial soak. The 0.1M NaOH sample has blistered more after being placed into the water but still not as much as the water and 0.01M NaOH samples. The samples were rinsed with DI water and allowed to air dry. All dried smooth and the 0.1M and 0.01M NaOH samples have small shiny spotted areas on the CNT surface. Resistance was tested with 4 pin tester before and after soaking (Table 9).

TABLE 9

Resistance Change of HCl, water, and NaOH Treated Coupons

| Condition | Initial Resistance after Applying CNT's | Resistance after Wash |
|---|---|---|
| Water | 2.13 | 1.95 |
| Water | 2.08 | 2.11 |
| 0.1M HCl | 2.03 | 1.50 |
| 0.1M HCl | 1.97 | 1.51 |
| 0.01M HCl | 1.89 | 1.67 |
| 0.01M HCl | 2.03 | 1.76 |
| 0.1M NaOH | 2.03 | 2.82 |
| 0.1M NaOH | 2.35 | 2.65 |
| 0.01M NaOH | 2.29 | 2.55 |
| 0.01M NaOH | 2.38 | 2.48 |

Figure 7:
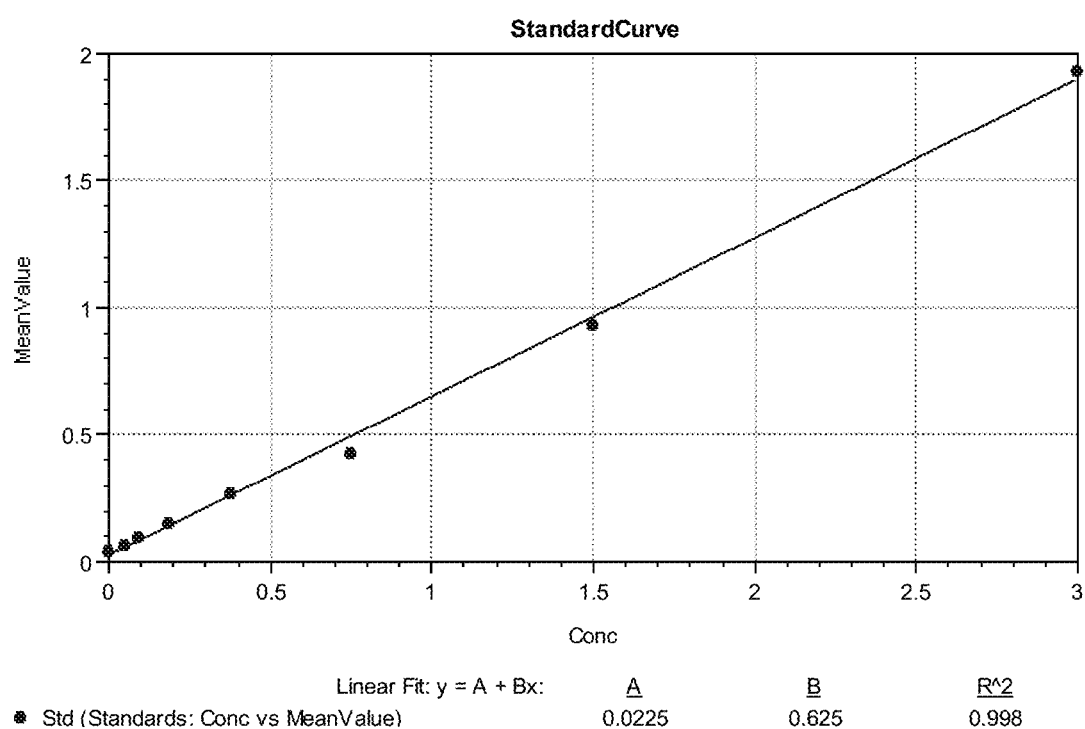
FIG. 7 shows a Glucose Standard Curve from 3 mM-0.047 mM

The wash samples were analyzed using the phenol-sulfuric acid carbohydrate assay. Standards of known glucose concentrations were assayed as well (Table 10, FIG. 7). A 0.148% HA solution was also tested. Our results show that the carbohydrate assay has a working range with glucose that is similar to what is reported by Musako (3 Mm-0.1 mM). The sample containing 0.148% hyaluronic acid gave a measurable absorbance at 490 nM, but it is likely glucose and HA is reacted differently with the phenol/sulfuric acid, so subsequent assays were performed using standards made from HA (Table 11). Glucose was used in this initial assay to demonstrate equivalency to the published paper that was used to model the assay. A quantifiable amount of HA was not detected in the water wash samples but they were slightly above background, however there may be such a small amount eluted from the CNT coating that it is not detectable in this assay and the pale yellow color, due to leaching from the primer, could interfere with quantitation in this assay. The HCl rinse samples as well as the 0.1M HCl alone cause the samples to turn a pale yellow in the sulfuric acid/phenol reaction even if neutralized with NaOH. Samples containing HCl cannot be measured in the carbohydrate assay and the pale yellow gives increased absorbance at 490 nm where the carbohydrate assay reaction is measured.

The amount of sodium present in the HA solution was determined by IC analysis and also by reacting the solution with silver nitrate. Two 0.296% solutions of HA were made in both house DI water and milli-Q water. This was done to determine if additional chloride ions could be introduced from the water source that is used to make CNT slurry's (house DI). IC analysis showed that both samples contain approximately 4.3 PPM chloride. Chloride was below the detection limit for the silver nitrate assay (3×10−9 ml/L).

TABLE 10

Glucose Standards Values

| Sample | Conc (mM) | BackCalcConc (mM) | Wells | Value OD 490 |
|---|---|---|---|---|
| St01 | 3 | 3.047 | A1 | 1.925 |
| St02 | 1.5 | 1.447 | B1 | 0.926 |
| St03 | 0.75 | 0.649 | C1 | 0.428 |
| St04 | 0.375 | 0.396 | D1 | 0.27 |
| St05 | 0.188 | 0.21 | E1 | 0.154 |
| St06 | 0.094 | 0.115 | F1 | 0.094 |
| St07 | 0.047 | 0.06 | G1 | 0.06 |
| St08 | 0 | 0.029 | H1 | 0.041 |

TABLE

Unknown samples interpolated from glucose standard curve

| Sample | Wells | Value OD 490 | Result (mM) |
|---|---|---|---|
| 0.1M HCl | A2 | 0.419 | 0.635 |
| 0.01M HCl | B2 | 0.047 | 0.039 |
| 0.1M NaOH | C2 | 0.037 | 0.024 |
| 0.01M NaOH | D2 | 0.037 | 0.024 |
| Jan. 29, 2014 Water soak - 1 | E2 | 0.038 | 0.025 |
| Jan. 29, 2014 water soak - 2 | F2 | 0.038 | 0.025 |
| Jan. 29, 2014 0.1M HCl soak -1 | G2 | 0.598 | 0.922 |
| Jan. 29, 2014 0.1M HCl soak -2 | H2 | 0.8 | 1.245 |
| Jan. 29, 2014 0.01M HCl soak -1 | A3 | 0.096 | 0.118 |
| Jan. 29, 2014 0.01M HCl soak -1 | B3 | 0.053 | 0.049 |
| Jan. 29, 2014 0.1M NaOH Soak -1 | C3 | 0.048 | 0.04 |
| Jan. 29, 2014 0.1M NaOH Soak-2 | D3 | 0.041 | 0.03 |
| Jan. 29, 2014 0.01M NaOH Soak -1 | E3 | 0.037 | 0.023 |
| Jan. 29, 2014 0.01M NaOH Soak -2 | F3 | 0.037 | 0.024 |
| 0.148% HA solution 54224-4 | G3 | 0.257 | 0.375 |
| Empty well | H3 | 0.027 | 0.008 |

Two of the water wash samples were freeze dried and a residue was visible. The dried residues were suspended in 120 μl of DI water. They were very dark yellow and could not be quantified in the carbohydrate assay due to the interfering color.

Figure 8:
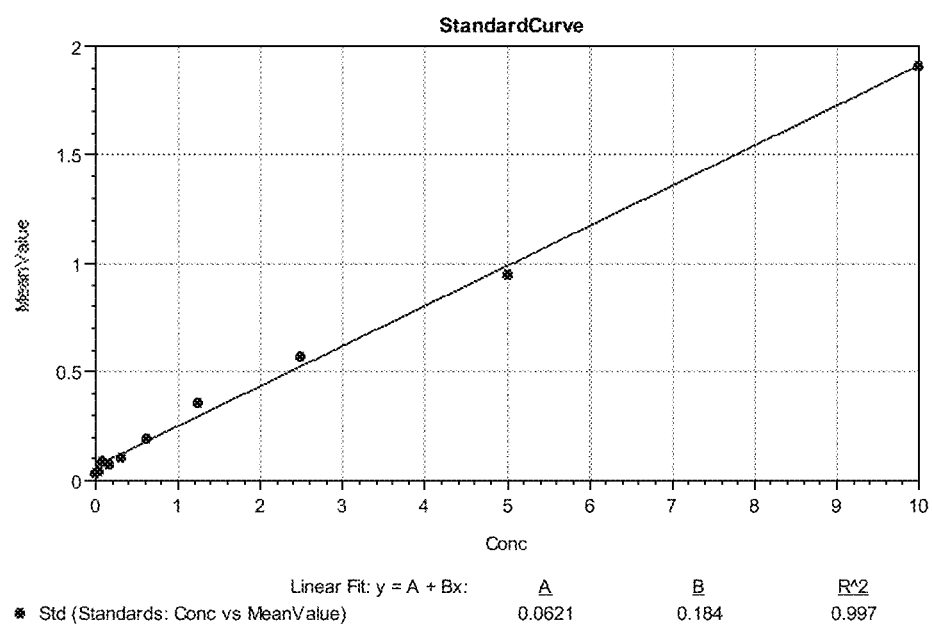
FIG. 8 shows a HAStandard Curve
Figure 9:
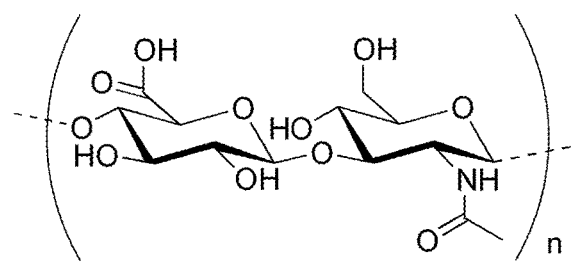
FIG. 9 shows the structure of hyaluron—D-glucuronic acid and D-N-acetylglucosamine, linked via alternating β-1,4 and β-1,3 glycosidic bonds.

The phenol sulfuric acid carbohydrate assay was repeated with standards made from hyaluronic acid. Additional test samples were also analyzed in this assay. The two freeze dried water wash samples that were prepared from water wash of coated coupons. A small volume water sample that was prepared by incubating 300 μl of water on the surface of a CNT coated primed coupon overnight in a humidified box. A sample that was prepared by soaking a QC slide spot in water until it delaminated and then placing the spot into a tube and adding 200 μl sulfuric acid and mixing well. The HA standards worked well having a curve fit of 0.997 and a working range from 10 mg/ml to 0.313 mg/ml (FIG. 8, Table 11). The small volume water soaked sample well was a faint brown color indicating HA was present and was estimated to contain 0.731 mg/ml HA from the standard curve. This sample did however have a slight yellow color to it initially due to primer leaching that may interfere with quantitation. The two freeze dried samples turned a pale green color and had a high absorbance at 490 however this is likely all due to interference from the dark yellow color to begin with. The CNT film sample well was faintly tan in color indicating HA was present; however, some CNT's were also in the well and may have scattered the light. The interpolated concentration of HA in this sample was 0.638 mg/ml.

TABLE 11

HA Standards Results

| Sample | HA Conc mg/ml | BackCalcConc | Wells | Value |
|---|---|---|---|---|
| St01 | 10 | 9.997 | B1 | 1.906 |
| St02 | 5 | 4.8 | C1 | 0.948 |
| St03 | 2.5 | 2.735 | D1 | 0.567 |
| St04 | 1.25 | 1.602 | E1 | 0.358 |
| St05 | 0.625 | 0.709 | F1 | 0.193 |
| St06 | 0.313 | 0.217 | G1 | 0.102 |
| St07 | 0.156 | 0.037 | H1 | 0.069 |
| St08 | 0.078 | 0.131 | A2 | 0.086 |
| St09 | 0.039 | −0.106 | B2 | 0.043 |
| St10 | 0 | −0.161 | C2 | 0.032 |

Dialyzed HA

A CNT dispersion was made with HA that had been dialyzed against water using 3500 MWCO tubing overnight with multiple changes of the water. HA (0.14767 grams) was dissolved in ~25 grams water overnight and then 10.43 grams water was added and the entire sample was loaded into dialysis tubing. It was dialyzed against ~4 L of water and was changed five times. A CNT dispersion was prepared from this and was applied to test coupons (18 coats) using an air brush and allowed to dry. Two samples were soaked in water and within a few minutes showed signs of blistering. Dialyzing the HA to remove small molecules did not prevent the blistering effect that we observed.

Large Scale Examples

The invention is also suitable to create large scale samples. Similar processes were used to create stable samples on substrates as large as 4 foot×2 foot. For example, an epoxy primed carbon fiber spar was prepared to have parallel Cu electrical leads adhered to the surface, using a structural epoxy. Cu leads could be either thin foil or braid, generally less than ¾ inch wide. Aqueous CNT/HA dispersion was spray applied to a masked section, making contact with the leads, to create a large conductive zone. The sample was air-dried overnight and the mask removed. For large, irregular shapes, the phosphoric acid wash step was modified. Dilute phosphoric acid with pH 2.5 was placed into a wash bottle. The acidic solution was sprayed onto the coated sample and allowed to drip into a collection container, continuously for approximately one minute. Next, the samples were washed with deionized water. The resulting sample was stabilized. In some examples, it was subsequently coated with a thin (<2 mil thick) coating of solvent-based epoxy primer. Finally, after curing, the part was coated with a MILSPEC polyurethane topcoat, and then the materials given a final cure and anneal at 65 C and 85% humidity for 24 h.

A similar stack-up was created on a sheet of polyethylene naphthalate that was primed with epoxy primer. A large soaking bath was used for the dilute phosphoric acid wash, rather than a rinse bottle.

The resistance of the samples, measured at the electrical leads and corrected for geometry to convert ohms to ohms/sq is shown in the table. The materials show a decrease in resistance after acid washing, and then an increase after topcoating and burn in. The increase in resistance is likely associated with minimal penetration of the topcoat materials into the CNT/HA coating and other relaxation phenomena. Both sample configurations produce stable materials. No changes in resistance were observed as the part was moved from different humidities and environments, which included icing spray. Like all conductive materials, CNTs have a temperature-dependent resistance, but the change in resistance over operating range from −22 F to 140 F is well below 5%. A sample placed in a cold chamber at −26 F and powered to give a surface temperature of 90 F was stable to over 21,000 cycles of powering on for 60 s and off for 120 s.

| Substrate | R of CNT after 24 h Airdry Ohm/sq | R of CNT after Phosphoric Acid Treatment Ohm/sq | R after topcoated and Burn in at 65 C. and 85% humidity Ohm/sq |
|---|---|---|---|
| Epoxy Primed Composite -- Airfoil 1 | | | |
| Heater Zone 1 | 2.52 | 1.67 | 3.45 |
| Epoxy Primed Composite -- Airfoil 2 | | | |
| Heater Zone 2 | 3.00 | 2.40 | 4.90 |
| Epoxy Primed Polyethylene Naphthalate | | | |
| 40 in × 14 in | 1.23 | 0.94 | 1.66 |

Submerging of the films in dilute acid solution is defined as any method that allows reaction of the phosphoric acid with the HA. Suitable methods include immersing films in a stable or stirring bath or actively spraying the solution onto a tilted substrate, allowing the excess to run-off. The specific method—whether with agitation or convection—will influence the kinetics. The treatment is fast relative, especially relative to the time it would take to remove high molecular weight HA from the CNT network.

What is claimed is:
1. A CNT composite, comprising:
a solid dispersion comprising CNTs and a glycosaminoglycan or polysaccharide;
wherein the dispersion comprises at least 20 wt % of the glycosaminoglycan or polysaccharide;
wherein the sum of Na, K, Mg, and Ca associated with the glycosaminoglycan or polysaccharide is less than 1 wt % of the dispersion; and
wherein the solid dispersion possesses one or more of:
a bulk conductivity of 500 S/cm or greater, and
a volume average size of CNT particles, as observable by SEM, of 5 μm or less, where size is the largest dimension observed in the SEM.
2. The CNT composite of claim 1 wherein the dispersion comprises CNTs and an anionic glycosaminoglycan; wherein the dispersion comprises CNTs and hyaluronic acid.
3. The CNT composite of claim 2 wherein the sum of all cations associated with the glycosaminoglycan or polysaccharide make up less than 1 wt % of the dispersion; or wherein the sum of Na, K, Mg, and Ca associated with the glycosaminoglycan or polysaccharide is 0.5 wt % or less of the dispersion.
4. The CNT composite of claim 1 wherein the CNT dispersion, without any topcoat, possesses moisture resistance such that, if a polyurethane topcoat that is about 1 mil (0.025 mm) thick is applied over the CNT dispersion and if the polyurethane coated CNT films is exposed to relative humidity of 40% at 60° C. for 60 hours, between the time of 30 to 60 hours of the exposure, the resistance of the composite increases by no more than 0.5%.

5. The CNT composite of claim 2 wherein the CNT composite comprises: a substrate, a primer layer, the CNT dispersion as a layer, and a polymeric topcoat.

6. The CNT composite of claim 1 wherein the solid dispersion has a bulk conductivity of 1000 S/cm or greater.

7. The CNT composite of any of claim 1 wherein the majority by the mass of the CNTs are single-walled CNTs.

8. The CNT composite of claim 1 wherein the dispersion comprises between 30 and 60 wt % CNTs.

9. The CNT composite of claim 1 wherein the dispersion comprises between 30 and 70 wt % glycosaminoglycan or polysaccharide.

10. The CNT composite of claim 1 further comprising a polymeric coating disposed over at least one surface of the dispersion.

11. The CNT composite of claim 1 wherein the dispersion has a resistance of 0.5 to 5 Ω/square or a conductivity of 1000 to 6000 S/cm.

12. The CNT composite of claim 2 wherein the sum of all cations associated with the glycosaminoglycan or polysaccharide make up less than 0.5 wt % of the dispersion; or wherein the sum of Na, K, Mg, and Ca associated with the glycosaminoglycan or polysaccharide is 0.2 wt % or less of the dispersion.

13. The CNT composite of claim 1 wherein the mass average molecular weight of the glycosaminoglycan or polysaccharide is in the range of 1000 to 100,000.

14. The CNT composite of claim 1 wherein the CNTs in the dispersion have a G/D of 12 to 17.

15. The CNT composite of claim 1 wherein the dispersion is a layer within a laminate.

16. The CNT composite of claim 1 having a polymeric topcoat over the CNT dispersion, the topcoat having a thickness of about 1 mil, and wherein the CNT dispersion possesses moisture resistance such that, if the CNT composite is exposed to a relative humidity of 40% at 60° C. for 60 hours and the resistance of the CNT dispersion is measured at the times of 30 to 60 hours of the exposure, the resistance of the CNT dispersion preferably increases by no more than 1% between the times of 30 to 60 hours of the exposure.

17. The CNT composite of claim 1 wherein the CNT dispersion, without any topcoat, possesses moisture resistance such that, if heated to 120° C. for 2 hours and cooled to room temperature for 10 minutes, the resistance increases by less than 100%.

18. A method of making the composite material according to claim 1 comprising:
providing a dispersion comprising CNTs and an anionic glycosaminoglycan or an anionic polysaccharide;
depositing a dispersion onto a surface to form a film;
wherein the film comprises the CNTs and the anionic glycosaminoglycan or anionic polysaccharide; and
washing the film with an aqueous acidic solution having a pH between 0 and 4.

* * * * *